US006379488B1

(12) United States Patent
Roth

(10) Patent No.: US 6,379,488 B1
(45) Date of Patent: Apr. 30, 2002

(54) PRINTABLE SHEET WITH REMOVABLE LABEL AND METHOD FOR PRODUCING SAME

(75) Inventor: Joseph D. Roth, Springboro, OH (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/525,123

(22) Filed: Mar. 14, 2000

Related U.S. Application Data

(62) Division of application No. 09/107,370, filed on Jun. 30, 1998, now Pat. No. 6,071,585.

(51) Int. Cl.[7] ................................................ B32B 31/18

(52) U.S. Cl. ........................ 156/268; 156/253; 156/270; 283/101; 283/81; 427/208.6; 427/208.8; 427/387; 427/408.1; 427/515; 427/516; 427/558

(58) Field of Search ................................. 156/268, 270, 156/253; 283/101.81; 427/208.8, 515, 516, 558, 208.6, 387, 407.1

(56) References Cited

U.S. PATENT DOCUMENTS

| | | | | |
|---|---|---|---|---|
| 4,716,052 A | * 12/1987 | Waugh | .................... | 427/208.8 |
| 5,632,842 A | * 5/1997 | Oliver | ........................ | 156/268 |
| 6,071,585 A | * 6/2000 | Roth | .......................... | 428/41.8 |

* cited by examiner

*Primary Examiner*—Nasser Ahmad
(74) *Attorney, Agent, or Firm*—Millen White Zelano & Branigan PC

(57) ABSTRACT

Printable sheets such as business forms and adhesive play mats having removable labels integrated therein are produced by applying pressure-sensitive adhesive directly to the base sheet of the printable sheet without a paper backing and encapsulating the adhesive with a solid silicone layer. The base sheet is die cut or perforated in regions where the adhesive is applied to define removable labels.

9 Claims, 5 Drawing Sheets

PRINTABLE SHEET WITH REMOVABLE LABEL AND METHOD FOR PRODUCING SAME

This is a divisional of application Ser. No. 09/107,370 Jun. 30, 1998 which issued as U.S. Pat. No. 6,071,585.

FIELD OF THE INVENTION

The present invention is directed to a printable sheet such as a business form having an integral label associated therewith which does not require a paper backing for the label. The invention is also directed to a method for making such a printable sheet.

BACKGROUND OF THE INVENTION

In the manufacture of printable sheets such as business forms and children's play mats, there are many circumstances in which it is desirable to form an integral, but ultimately separable, self-adhesive label as a part of the printable sheet. There are also many circumstances in which it is desirable to print on the self-adhesive label.

Conventional methods for the manufacture of printable sheets with integrated labels require either a) lamination of two webs of material, one for printing and the other to provide a backing for the label, or b) direct adhesion of a label laminate (label/adhesive/release layer/support) to the form. There are many variations of these two techniques. Where a label laminate is adhered to a paper sheet of a business form, it is typically applied on top of the paper sheet or edge thereof. See, for example, U.S. Pat. Nos. 4,865,669, 4,809,905 and 5,129,682. For the lamination techniques, a pressure-sensitive adhesive is typically applied to a portion of a paper sheet (first web) followed with a backing comprised of paper or similar material (second web) coated with release liner. A label is then cut from the paper sheet where the backing has been applied. Application of the pressure-sensitive adhesive and backing material with release liner is often accomplished simultaneously with the use of a transfer tape. The transfer tape is applied to the rear face of the paper sheet with the adhesive contacting the rear face of the paper sheet. Once the transfer tape is applied, the pressure-sensitive adhesive transfers from the tape to the paper sheet. Other examples of laminating techniques used to produce business forms with labels integrated therein are described in U.S. Pat. Nos. 5,507,901, 5,632,842 and 5,656,369. These laminating techniques, as well as methods for direct adhesion of labels to a form, require complex paper handling apparatus which must either align and adhere a label laminate to a paper sheet or align and adhere a paper sheet (first web) with a backing (second web) to provide the integrated label. In addition, where a second web is used, there is an increased risk of paper jams in printing equipment due to the increased thickness of the printable sheet at the label. There is also a risk of loss of the backing (second web) during printing or handling, resulting in exposure of the adhesive. Certain methods have specialized problems as well, for example, forms made with the use of transfer tape also have a tendency to curl and additional care is needed to flatten these forms.

SUMMARY OF THE INVENTION

The present invention overcomes the disadvantages of conventional methods and printable sheets with integrated labels in not requiring the alignment and adhesion of a separate (second) web to a paper sheet for the backing of the integrated label. In eliminating the need for a separate (second) web for the backing of the integrated label, the opportunity for a printable sheet to lose the backing is reduced and the opportunity for the printable sheet to jam printing equipment during use is also reduced.

The printable sheets of the present invention provide an integral label associated therewith and removable therefrom. This printable sheet comprises a base sheet having a front face and a rear face. The front face is capable of receiving print. The rear face is capable of having a pressure-sensitive adhesive adhere thereto and is also capable of receiving print for most embodiments. A pressure-sensitive adhesive layer is coated on a portion of the rear face of the base sheet and a solid silicone layer is coated over the pressure-sensitive adhesive. The solid silicone layer overlaps the pressure-sensitive adhesive so as to bond to the rear face of the base sheet by the overlapping portion. The solid silicone layer comprises ultraviolet light cured silicone polymers or electron beam cured silicone polymers which have been cured (crosslinked) in place over the pressure-sensitive adhesive and encapsulate the adhesive. The solid silicone layer provides a release face (surface) for the pressure-sensitive adhesive. At least one perforation or die cut is formed in a portion of the base sheet coated with pressure-sensitive adhesive on the rear face to define at least one removable layer.

The method of this invention produces a printable sheet such as a business form with removable labels and comprises providing a base sheet having a front face suitable for printing and a rear face suitable for adhering a pressure-sensitive adhesive. In most embodiments, the rear face is suitable for printing as well. A layer of pressure-sensitive adhesive is coated on a portion of the rear face of the base sheet. The layer of pressure-sensitive adhesive is coated with at least one layer of a liquid silicone resin coating formulation which cures to a solid upon exposure to ultraviolet light or electron beam radiation. The layer of liquid silicone resin coating formulation extends beyond the layer of pressure sensitive adhesive to the rear face of the base sheet. The coating of liquid silicone resin coating formulation is cured to a solid silicone layer by exposure to ultraviolet light or electron beam radiation. A portion of the base sheet having the pressure-sensitive adhesive and curable silicone resin on the rear face thereof is die cut or perforated in a pattern and at a depth which defines a removable label.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
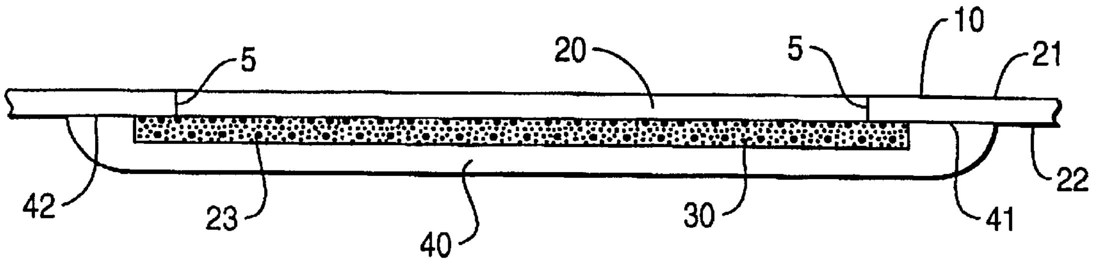
FIG. 1 is a cross-sectional view of a portion of a printable sheet of the present invention where the removable label is located.

FIG. 1 is a cross-sectional view of a portion of a printable sheet of the present invention where the integral label is located. The thickness of the components is greatly exaggerated for clarity of illustration.

In FIG. 1, base sheet 10 has a die cut 5 which extends completely through the base sheet and integrated label 20. Base sheet 10 has a front face 21 for printing and a rear face 22. Pressure-sensitive adhesive layer 30 is coated on a portion of rear face 22 of base sheet 10 which defines integrated label 20 and covers the entire rear face of label 20. Solid silicone layer 40 is positioned over pressure-sensitive adhesive 30 and overlaps pressure-sensitive adhesive 30 at portions 41 and 42, which bond the solid silicone layer 40 to rear face 22 of base sheet 10. Both pressure-sensitive adhesive layer 30 and solid silicone layer 40 extend beyond die cut 5 which defines and separates integral label 20 from base sheet 10. Die cut 5 can alternatively be a perforation which defines label 20, wherein label 20 remains attached to base sheet 10. The base sheet 10 can be perforated before or after the application of pressure-sensitive adhesive layer 30 and solid silicone layer 40. In FIG. 1, pressure-sensitive adhesive layer 30 covers the entire rear face 23 of integral label 20. However, printable sheets of the present invention include those wherein only portions of rear face 23 of the integral label are coated with pressure-sensitive adhesive.

Figure 5:
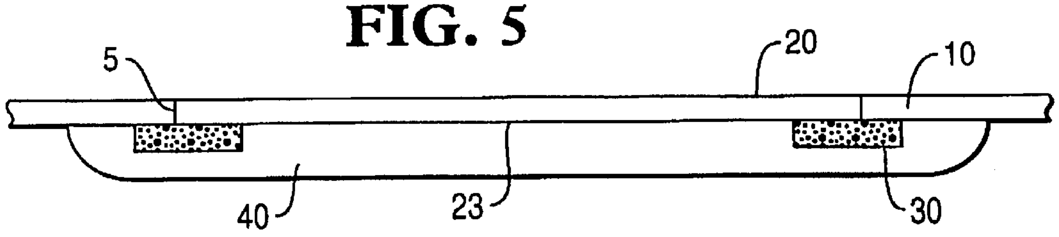
FIG. 5 is a cross-sectional view of a portion of a printable sheet which comprises another embodiment of the present invention.
Figure 7:
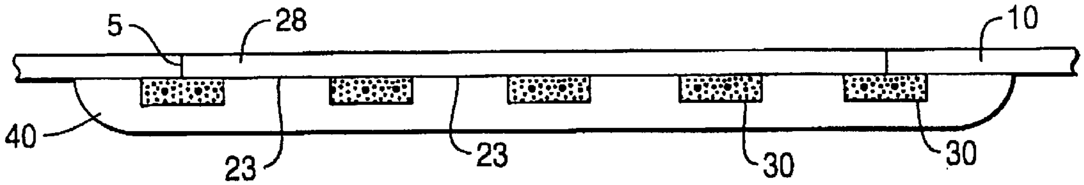
FIG. 7 is a cross-sectional view of a portion of a printable sheet which comprises yet another embodiment of this invention.

FIGS. 5 and 7 show alternative embodiments, wherein only portions of the rear surface 23 of integral label 20 are coated with adhesive layer 30 with the solid silicone layer 40 filling gaps between the adhesive layer portions.

Figure 6:
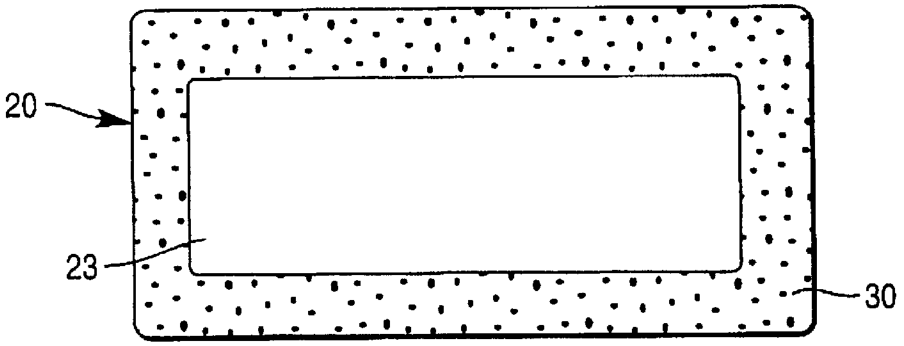
FIG. 6 is the rear view of the label removed from the printable sheet of FIG. 5.
Figure 8:
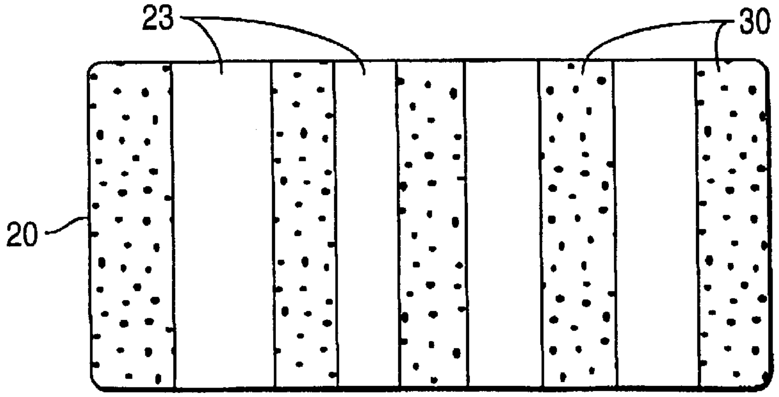
FIG. 8 is a rear view of the label removed from the printable sheet of FIG. 7.

FIGS. 6 and 7 each show the rear face 23 of label 20 separated from the base sheet 10 with a pattern of pressure-sensitive adhesive 30 thereon. The labels shown in FIGS. 6 and 8 correspond to the labels in FIGS. 5 and 7, respectively.

Figure 2:
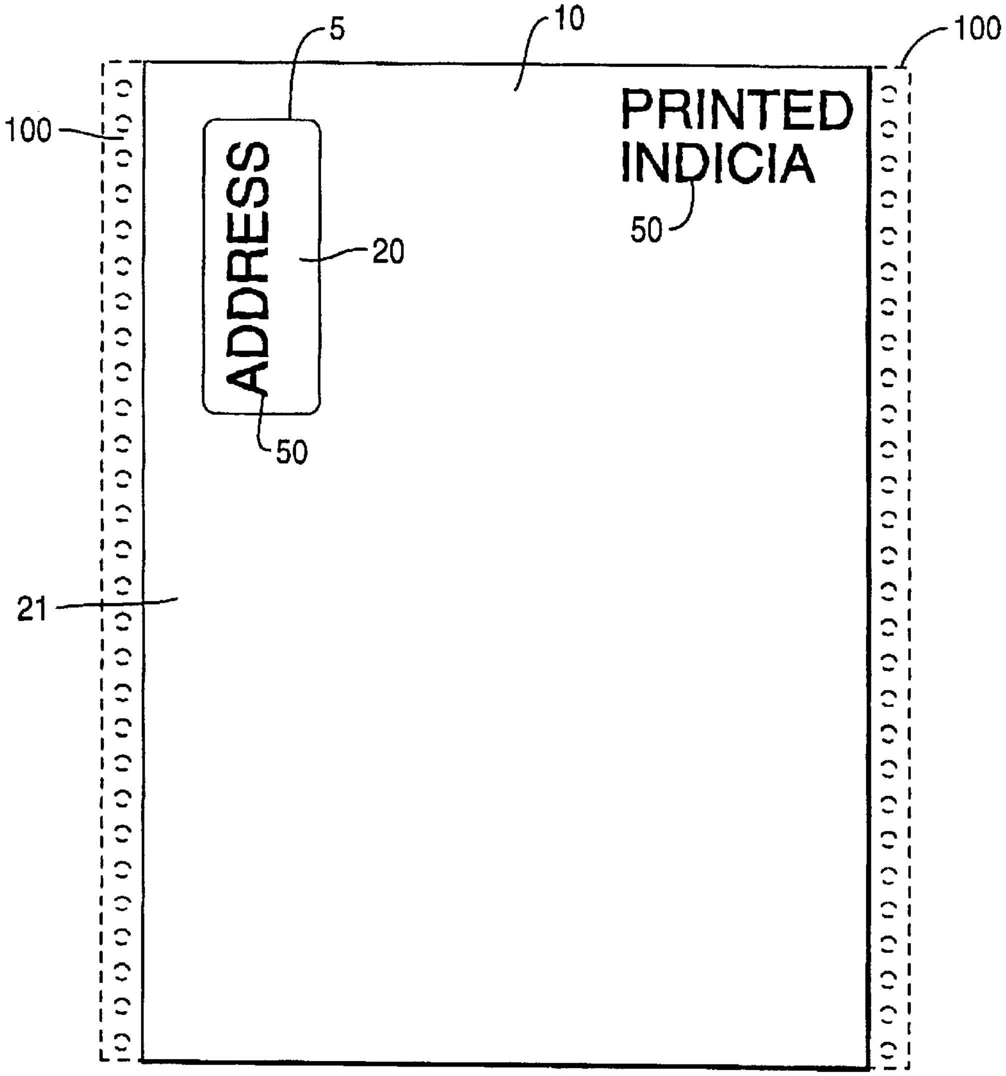
FIG. 2 is a front view of a printable sheet of the present invention with one removable label.

FIG. 2 illustrates a printable sheet of the present invention with front face 21 of base sheet 10 shown. The embodiment of FIG. 2 has only one integral label 20 defined by die cut 5. Optional removable perforated edges 100 are shown in this embodiment. The embodiment is shown after to printing with printed indicia 50 on front face 21 and on label 20.

Figure 3:
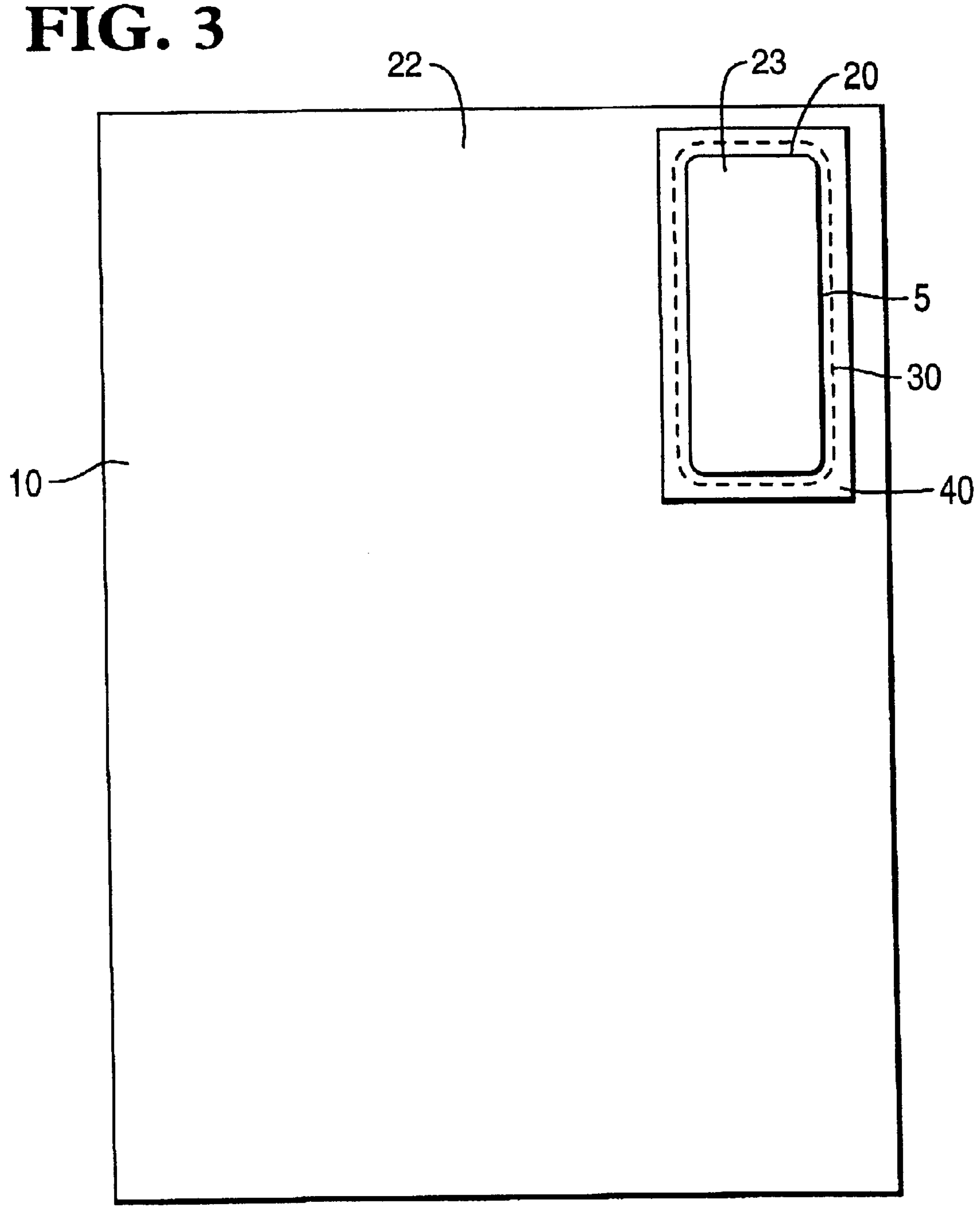
FIG. 3 is a rear view of the printable sheet of FIG. 2.

FIG. 3 is the rear side of the printable sheet shown in FIG. 1 with perforated edges 100 removed. Rear face 22 of base sheet 10 is shown with solid silicone layer 40 positioned thereon, overlaying pressure sensitive adhesive 30. In FIG. 3, solid silicone layer 40 and pressure sensitive adhesive 30 are semi-transparent, such that die cut 5 and rear face 23 of label 20 can be seen through them.

Figure 4:
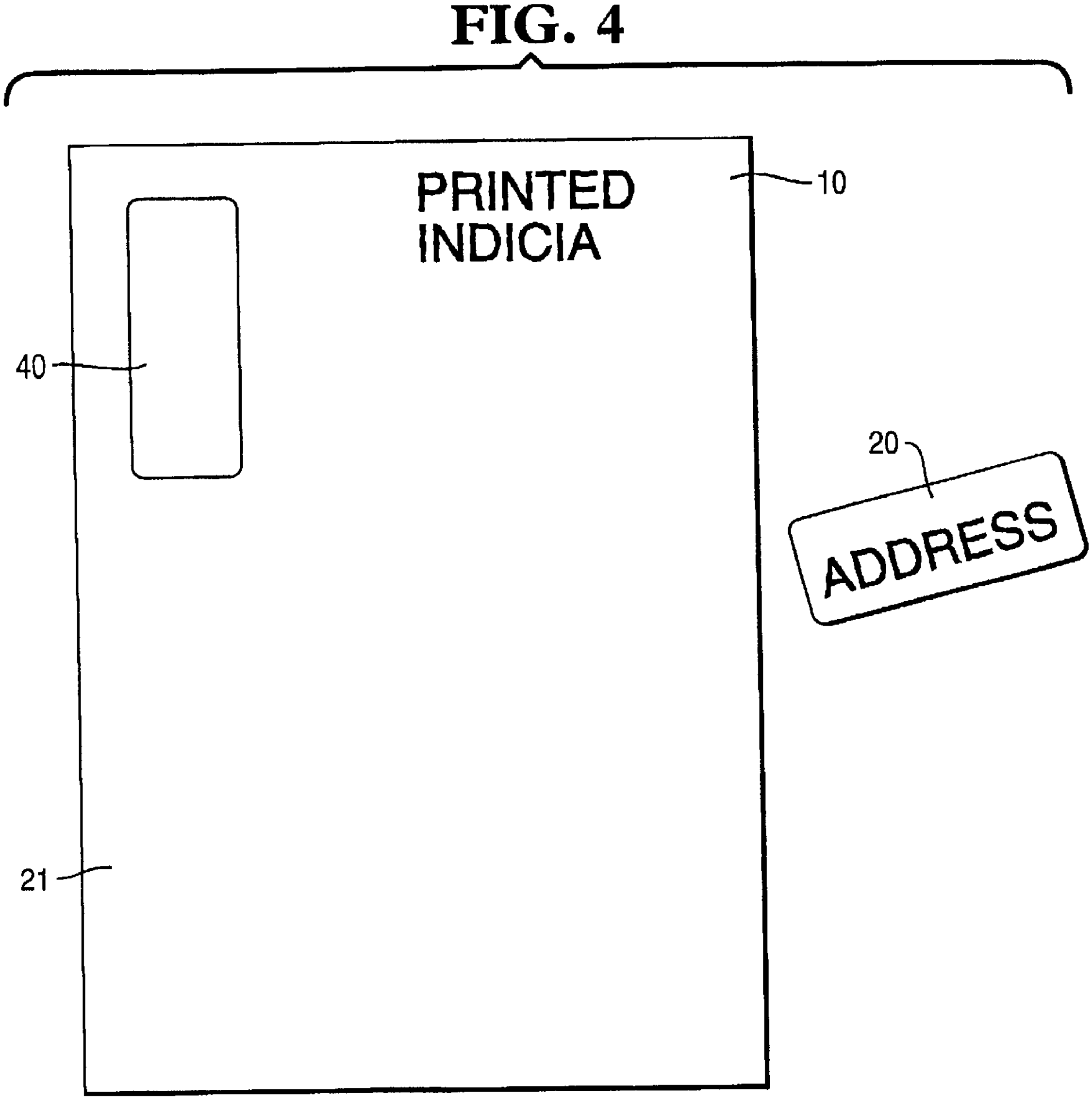
FIG. 4 is a front view of the printable sheet of FIG. 2 with the label removed.

FIG. 4 illustrates front face 21 of base sheet 10 for the printable sheet of FIG. 2, wherein the label 20 has been removed such that solid silicone layer 40 is now exposed where integrated label 20 once was.

Base sheet 10 is preferably a base sheet conventionally used in business forms and children's play mats and is typically a commercially available paper, but can include specialty papers and other cellulosic material such as cardboard or synthetic polymer materials. This includes individual paper sheets as well as continuous paper rolls and continuous paper fanfolds or similar continuous folding arrangements for paper. The paper can also be part of a multi-page form. The paper can be coated or uncoated, however, the front face 21 of the paper must be suitable for printing and rear face 22 of the paper must be suitable for adhesion of a pressure-sensitive adhesive. Rear face 22 may also be suitable for printing as well, but such a feature is not required. To obtain these properties from conventional, commercially available papers typically does not require any special coating or preparation; however, the rear face 22 of conventional paper cannot be coated with a release layer or similar coating to which the pressure-sensitive adhesive cannot bond. The base sheet 10 is preferably sufficiently thick to provide sufficient strength such that integral label 20 can be cut and removed from printable sheet in one piece and printing can be performed on front face 21.

Pressure-sensitive adhesive 30 can be a conventional pressure-sensitive adhesive used for labels. These include adhesives based on silicone resins, ethyl vinyl acetate copolymers, polyurethanes, polychloroprenes, polybutadienes, butadiene acrylonitrile rubbers, natural rubbers, styrene butadiene rubbers, acrylics, polyisobutylenes, butyl rubbers, higher polyvinyl alkyl ethers, S-B-S block copolymers, polyacrylate esters, vinyl ethers, styrene-isoprene butadiene acrylonitrile polymers. Preferred pressure-sensitive adhesives include hot melt pressure-sensitive adhesives. The pressure sensitive adhesive can be U.V. curable where desired. Effective hot-melt, silicone resin-based, pressure-sensitive adhesives are described in U.S. Pat. No. 5,482,988. Solvent-based pressure-sensitive adhesives, as well as water-borne adhesives, are suitable as well. Suitable solvent-based silicone resin, pressure-sensitive adhesives include those described in U.S. Pat. Nos. 4,460,371 and 5,100,976. U.S. Pat. No. 5,489,624 describes suitable hydrophilic polyethylene oxide-based pressure-sensitive adhesives. U.S. Pat. No. 4,647,504 describes suitable adhesive dispersions based on methylacrylate, styrene and methacrylate polymers. U.S. Pat. No. 5,512,612 describes suitable water dispersible, poly(alkoxyalkyl)acrylate polymers and U.S. Pat. No. 5,716,701 describes suitable acrylic copolymer emulsions.

The amount of the pressure-sensitive adhesive employed (coat weight) is preferably consistent with that employed in conventional labels. The viscosity of the adhesive also preferably conforms to conventional adhesives used in labels so that adhesive does not leak through the die cut or perforations.

Solid silicone layer 40 is a U.V. cured or electron beam cured silicone resin, preferably a cationically U.V. cured or electron beam cured silicone resin.

Silicone layer 40 is cured over pressure-sensitive adhesive 30 to encapsulate the adhesive and overlap the pressure-sensitive adhesive to bond to the base sheet 10. Solid silicone layer 40 can essentially coat the entire rear face of base sheet 10, but is not preferred. Solid silicone layer 40 is derived from a liquid coating formulation comprising U.V. or electron beam curable silicone resins which preferably contains a curing agent activated by U.V. or electron beam radiation. Preferred silicone resins are epoxy silicones as exemplified in U.S. Pat. Nos. 5,583,195, 5,500,300 and 5,614,640, and acrylofunctional silicones as exemplified in U.S. Pat. Nos. 4,665,147, 4,504,629, 4,563,539, 4,503,208, 4,575,546 and 5,179,134. Resins which provide dual cures, i.e., U.V. and moisture curing, include those described in U.S. Pat. Nos. 5,405,888, 5,384,340, 5489,622 and 5,714,524.

It is critical that the solid silicone layer be sufficiently cured so as to limit migration of polymers therein into the pressure-sensitive adhesive, which then interfere with subsequent use of the label. It is preferable that the solid silicone layer 40 have less than 4 wt. % extraction, based on the total weight of the layer, after exposure to hexane. The solid silicone layer may be cured with the aid of conventional curing (crosslinking) agents, such as the photoinitiators described in U.S. Pat. No. 4,507,187. Examples of suitable commercially available liquid U.V. curable silicone resins are U.V. 9300 or 9305 used a coating formulation with photoinitiator 9365 available from General Electric. Similar release materials are available from Goldschmidt.

The solid silicone resin layer 40 contains particulate fillers to enhance strength. The fillers must be of a size which does not scatter U.V. light and are preferably less than ½ the size at which they scatter light, so as not to interfere with penetration of the U.V. radiation and curing of the silicone layer. Underivatized fumed silica is a preferred filler. Fumed silica particles are preferably less than 200 nanometers and more preferably have a size less than 20 nanometers. Suitable examples of particulate silicas include Cab-o-sperse® ®2, Cab-o-sperse® A205, Cab-o-sperse® A105, Cab-o-sperse® P-1175, Cab-o-sperse® S-109, Cab-o-sperse® P-1010, available from Cabot Corporation, Cab-o-sil Division, Tuscola, Ill., and Aerosil 130, Aerosil 200 and Aerosil MOX80, available from Degussa Corporation, Ridgefield Park, N.J. The amount of filler preferably falls within the range of 2–45 wt.%.

The solid silicone layer 40 overlays the pressure-sensitive adhesive 30 so as to encapsulate the pressure-sensitive adhesive over rear surface 23 of label 20 and bond to the rear surface 22 of the base sheet 10 by the overlapping portions 41 and 42. Preferably, the overlap is as least ¼ inch from the edge of the pressure-sensitive adhesive.

Curing the solid silicone resin layer on top of the pressure-sensitive adhesive provides great flexibility in patterning the pressure-sensitive adhesive and the silicone resin layer to provide configurations as shown in FIGS. 5–8.

The thickness of the solid silicone layer varies widely and preferably is greater than 0.1 mm and most preferably in the range from 0.1 to 4 mm. A minimum thickness of 0.1 mm is necessary to provide the strength needed to support the integrated label. The silicone layer provides a release face (surface) for the pressure sensitive adhesive. This enables transfer of the adhesive to the rear face 23 of label 20 when removed from the printable sheet. The silicone resin may optionally be further modified by the incorporation of fluorine, which aids in the release of adhesive.

Figure 9:
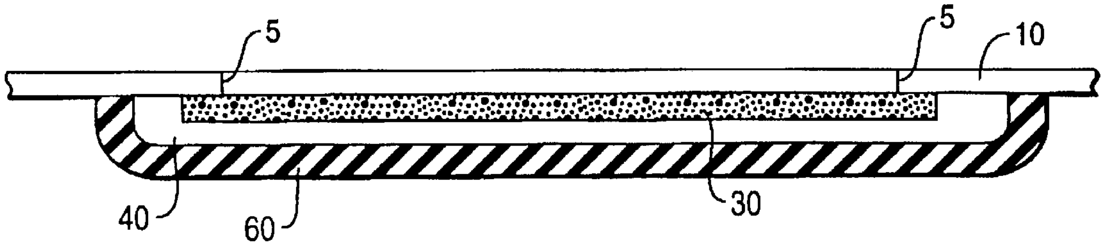
FIG. 9 is a cross-sectional view of a portion of a printable sheet which comprises another embodiment of the present invention.

To enhance the performance of a silicone layer, multiple silicone layers may be applied to increase strength. In fact, distinct silicone layers can be applied such that high release may be provided by an inner layer, while strength is provided by an outer layer. Such an embodiment is shown in FIG. 9, wherein solid silicone layer 40 is coated with solid silicone layer 60. The multiple silicone layers can be cured either simultaneously or sequentially. The two solid silicone layers may comprise the same silicone resins containing distinct levels of curing agent.

The label 20 is defined within the printable sheet by either a die cut or perforation within the base sheet to enable easy removal. Perforations can be accomplished either before or after application of the pressure-sensitive adhesive and solid silicone layer. Where the labels are die cut before application of the adhesive and silicone layer, means for securing them must be provided. The printable sheet may include more than one label defined by a die cut or perforation. Up to 90% of the printable sheet may comprise labels, but such labels must be surrounded by a border of the base sheet for support. At least 50% of the perimeter of the each label must be bordered by the base sheet. Preferably, less than 75% of the printable sheet comprises labels and most preferably less than 50% of the printable sheet comprises labels.

The adhesive layer and solid silicone layer do not present a significant increase in the thickness of the printable sheet and are well secured to the base sheet, thus reducing printing complications. The labels show good stability so as not to release during printing and provide good adhesion when applied to another base sheet for their ultimate use.

The method of the present invention provides printable sheets with removable labels integrated therein. The method comprises providing a base sheet having a front face suitable for printing and a rear face suitable for adhering to a pressure-sensitive adhesive. The conventional paper substrates discussed above with respect to the printable sheets of the present invention are suitable, as well as synthetic polymer substrates and other cellulosic materials discussed above. A portion of the rear surface of the base sheet is coated with a layer of pressure-sensitive adhesive. This can be accomplished by conventional means, including brushing, spreading, spraying, rolling, extruding, gravure with conventional equipment such as a kiss roll, air knife or doctor blade. For greater control over the location of the pressure sensitive adhesive, flexographic printing methods and equipment can be used. Flexographic printing methods and equipment will provide adhesive layers with coat weights at levels consistent with the amounts of adhesive used in conventional labels.

Suitable pressure-sensitive adhesives include those described above with respect to the printable sheets of the present invention. The pressure-sensitive adhesive must have a viscosity so that it will not leak from the layer, either during manufacture or subsequent printing. Although not preferred for large scale use, it may be desirable to apply the pressure-sensitive adhesive to selected areas through the use of a transfer tape. With such methods, the backing is removed following migration of the adhesive to the rear face of said base sheet.

Following application of the pressure-sensitive adhesive, a curable silicone resin coating formulation is applied to the pressure-sensitive adhesive which comprises a curable silicone resin and curing agent. The curable silicone resin is crosslinked by exposure to U.V. or electron beam radiation with the aid of curing agents. Suitable curable silicone resins include those described above for the printable sheets of this invention. These silicone resins have the requisite particulate fillers for strength, as described above for the printable sheets of the present invention.

The curable silicone resin can be applied by conventional techniques, as in the case the pressure-sensitive adhesive, i.e., through brushing, spray-coating, extrusion, roller coating, gravure or application with a kiss roll, air knife or doctor blade, such as a Myer rod. Flexographic printing techniques and equipment can also be used. For the best control over the location of the silicone layer, flexographic printing methods and spray methods may be preferred. Once applied over the adhesive, the curable silicone resin is cured to a solid. If desirable, more than one layer may be applied over the pressure-sensitive adhesive. This can include one or more of the same silicone resin formulations or distinct formulations. The multiple layers can be cured simultaneously or sequentially. Where the multiple layers will have a high thickness, sequential cure is desirable to ensure penetration of U.V. or electron beam radiation, particularly where high levels of particulate fillers are used.

It is necessary that the curable silicone resins be cured to a level so that the less than 4 wt. % is extracted from the solid silicone layer in the presence of toluene. The silicone resin can be cured in a conventional light array, light box or electron beam apparatus.

The base sheet is cut to define at least one removable label by either perforations or a die cut that completely surrounds the label. The base sheet is cut at the location where the pressure-sensitive adhesive and solid silicone layer are applied such that the adhesive and solid silicone layer overlap the die cut or perforations which define the removable label. Cutting perforations can be performed before or after application of the adhesive and solid silicone layer. Where die cuts which completely surround the label are desired, it is preferable to perform this operation after the adhesive and solid silicone layer are applied.

To ensure the silicone resin has sufficient rigidity to support the label, it is necessary that it have a thickness of at least 0.1 mm and overlap the adhesive layer by at least ¼ inch on all sides.

The entire disclosure of all applications, patents and publications, cited above and below, is hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method of producing a printable sheet with removable labels, which comprises:

a) providing a base sheet having a front face suitable for printing and a rear face suitable for adhering a pressure sensitive adhesive;

b) coating a portion of the rear face of said base sheet with a layer of pressure sensitive adhesive;

c) coating said layer of pressure sensitive adhesive with at least one layer of a liquid silicone resin coating formulation which cures to a solid upon exposure to ultraviolet light or electron beam radiation, wherein said layer of liquid silicone resin coating formulation extends beyond the layer of pressure sensitive adhesive to the rear face of the base sheet;

d) curing said layer of silicone resin coating formulation by exposure to ultraviolet light or electron beam radiation to obtain a solid silicone layer; and e) cutting or perforating a portion of said base sheet in a pattern and at a depth and frequency which defines a removal label;

wherein the portion of the base sheet which is cut or perforated has said pressure sensitive adhesive and solid silicone resin layer on the rear face thereof.

2. A method as in claim 1, wherein the base sheet is perforated prior to coating the base sheet with the pressure sensitive adhesive and the layer of silicone resin formulation.

3. A method as in claim 2, wherein coating the layer of pressure sensitive adhesive with at least one layer of silicone resin formulation comprises coating two or more layers of liquid silicone resin coating formulations which cure to a solid upon exposure to U.V. light or electron beam radiation.

4. A method as in claim 3, wherein the two or more layers are cured to a solid simultaneously.

5. A method as in claim 3, wherein the layer of silicone resin coating formulation comprises particulate fillers in an amount in the range of 5 to 45 wt. % based on the total weight of solids in the coating formulation, wherein said fillers have an average particle size below 200 nanometers.

6. A method as in claim 1, wherein the pressure sensitive adhesive is U.V. cured.

7. A method as in claim 1, wherein said base sheet is die cut or perforated to define a plurality of labels, each bordered by a matrix portion of the base sheet.

8. A method as in claim 1, wherein said base sheet is die cut or perforated to define a plurality of labels comprising up to 75% of said base sheet, wherein at least 50% of the perimeter of each label is bordered by a matrix portion of the base sheet.

9. A method as in claim 1, wherein the rear face of said base sheet is also suitable for printing.

* * * * *